UNITED STATES PATENT OFFICE.

JOHN MATTHEWS, OF NEW YORK, N. Y.

IMPROVEMENT IN THE MANUFACTURE OF BEER AND ALE.

Specification forming part of Letters Patent No. 168,268, dated September 28, 1875; application filed August 5, 1875.

*To all whom it may concern:*

Be it known that I, JOHN MATTHEWS, of the city, county, and State of New York, have invented certain new and useful Improvements in the Manufacture of Beer and Ale; and I do hereby declare that the following is a full, clear, and exact description thereof, which will enable others skilled in the art to which it pertains to make and use the same.

The beverages now known under the general titles of beer and ale, as now prepared by the brewer's art, are composed of water, vegetable extractive matter, hop flavoring, alcohol, and certain ethers and glycerine, the alcohol, the ethers, and glycerine being developed by the fermentation of the other ingredients used in brewing. The production of the alcohol is very expensive, because the sweet parts of the malt are destroyed or changed in its production. The complete fermentation of the extractive matter is a very difficult and delicate operation, requiring a nice adjustment of temperature and the time for carrying it out properly, so as to obtain good results. There is also great liability to set up what is called putrefactive fermentation, accompanied by the production of acetic and lactic acids, so as to occasion the loss of the whole useful product.

My invention consists in making beers and ales by using malt extract, hop extract, or infusion of hops, made preferably by cold percolation, grape-sugar or glucose, or other sugar, and pure or deodorized alcohol. With the hop extract may be used any of the innocuous bitter and fragrant vegetable extracts, to give additional bitterness, flavor, and bouquet, and to assist in imparting the qualities developed during fermentation, or what is known as the yeasty flavor. I add a little formic or other appropriate ether, and sometimes a small quantity of pure glycerine, to impart smoothness.

Instead of alcohol I may use any pleasantly-flavored wine that contains a sufficient amount of alcohol.

The following are given as examples of working formulas for various kinds of ale and beer.

*For Berlin Weitzen or White Beer.*—Infusion of malt, one-half gallon; grape-sugar, five and one-half pounds; white Bordeaux wine, one-fourth gallon; alcoholic extract of yeast, one pound twelve ounces.

*For Lager-Beer.*—Infusion of malt, one-half gallon; infusion of hops, one-fourth gallon; formic ether, one-fourth ounce; infusion of coriander, one ounce; grape-sugar, six pounds.

*For Dublin Porter.*—Infusion of dark or well-browned malt, three-fourths gallon; hops, one-fourth gallon; formic ether, one-half ounce; glucose, four pounds.

*For Pale Ale.*—Infusion of malt, three-fourths gallon; infusion of glucose, three pounds; absolute alcohol, one-fourth gallon; formic ether, one-fourth ounce; white wine, one-eighth gallon.

*For Common Beer.*—Malt, one-half gallon; hops, one-fourth gallon; formic ether, one dram; caramel, two ounces; glucose, three and a half pounds; absolute alcohol, two pounds.

These formulas may be varied *ad libitum* by persons skilled in the art of compounding beverages without departing from the spirit of this invention.

The materials thus compounded I place in a copper or other suitable vessel, and heat to 140° Fahrenheit, and, while hot, bottle and cork for use as required from time to time. This I call the "extract of beer."

I do not limit myself, however, to these exact materials, nor to the proportions, for it is obvious that a chemist may readily substitute other materials for some, and add others, without departing from the principle of this invention, and the proportions are to be varied to produce the various strengths, kinds, and qualities of beer and ale.

To prepare beer or ale I take a small quantity of the extract of beer and add to it a sufficient quantity of water to produce a beer of the required richness and strength. This I then place in a suitable apparatus, such as used in making aerated beverages, and charge with carbonic-acid gas.

I find that some kinds of ale and beer are best produced by adding a small quantity of brewer's yeast to the diluted beer extract, so as to set up a slight fermentation before charging with carbonic-acid gas. This occasions very little loss of saccharine and extractive matters, and has the effect to cause all the elements to coalesce and unite, as in beer and ale produced by the ordinary process of brewing. A suitable color may be given by the use of extract of brown malt, caramel, or other innocuous coloring material.

Having thus described my invention, what I claim, and desire to secure by Letters Patent, is—

1. The improved material herein described for producing beer and ale, called beer extract, and consisting of malt extract, hop extract, sugar, and alcohol, with or without flavoring and coloring materials such as named, the whole combined and put up for use substantially as specified.

2. The improved beverage herein described, consisting of beer extract, as described, water and carbonic-acid gas, substantially as set forth.

In testimony that I claim the foregoing as my own I have affixed my signature in presence of two witnesses.

JOHN MATTHEWS.

Witnesses:
A. F. BUTLER,
JOHN D. WILSON.